US009577568B2

(12) United States Patent
Loerincz et al.

(10) Patent No.: US 9,577,568 B2
(45) Date of Patent: Feb. 21, 2017

(54) DETECTION OF A WIRE-BREAK FAULT DURING THE OPERATION OF A BRUSHLESS D.C. MOTOR

(71) Applicant: CONTI TEMIC MICROELECTRONIC GMBH, Nuremberg (DE)

(72) Inventors: Robert Istvan Loerincz, Timisoara (RO); Andreas Schnell, Kammerstein (DE)

(73) Assignees: Conti Temic Microelectronic GmbH, Nuernberg (DE); Continental Automotive GmbH, Hannover (DE)

( * ) Notice: Subject to any disclaimer, the term of this patent is extended or adjusted under 35 U.S.C. 154(b) by 0 days.

(21) Appl. No.: 14/898,828

(22) PCT Filed: May 28, 2014

(86) PCT No.: PCT/EP2014/061177
§ 371 (c)(1),
(2) Date: Dec. 16, 2015

(87) PCT Pub. No.: WO2014/202370
PCT Pub. Date: Dec. 24, 2014

(65) Prior Publication Data
US 2016/0149533 A1    May 26, 2016

(30) Foreign Application Priority Data

Jun. 21, 2013  (EP) .................................... 13173182
Oct. 16, 2013  (DE) ........................ 10 2013 220 995

(51) Int. Cl.
*H02P 6/12*    (2006.01)
*H02P 29/02*   (2016.01)

(52) U.S. Cl.
CPC .............. *H02P 29/024* (2013.01); *H02P 6/12* (2013.01); *H02P 29/0241* (2016.02); *H02P 29/0243* (2016.02)

(58) Field of Classification Search
CPC ............. H02P 29/024; H02P 6/12; H02P 1/00; H02P 3/00; H02P 5/00; H02P 6/00; H02P 7/00
(Continued)

(56) References Cited

U.S. PATENT DOCUMENTS

| 7,812,590 | B2 | 10/2010 | Kaltenegger et al. |
| 8,497,651 | B2 | 7/2013 | Tang et al. |

(Continued)

FOREIGN PATENT DOCUMENTS

| DE | 10013537 A1 | 9/2001 |
| DE | 102008035325 A1 | 3/2009 |

(Continued)

*Primary Examiner* — Antony M Paul
(74) *Attorney, Agent, or Firm* — Laurence A. Greenberg; Werner H. Stemer; Ralph E. Locher

(57) ABSTRACT

A method recognizes a wire-break fault during operation of a brushless DC motor. A switch-on delay duration of a transition of an electrical phase potential that rests on the stator winding phase from a switch-off potential to a switch-on potential and a switch-off delay duration of the transition of the phase potential from the switch-on potential to the switch-off potential are detected for a stator winding phase of the stator winding of the motor during each pulse width modulation cycle period. Moreover, a lower deviation limit is defined for a deviation of detected switch-off delay durations from detected switch-on delay durations. A wire-break fault is deduced if the deviations of the detected switch-off delay durations from the detected switch-on delay durations fall below the lower deviation limit.

11 Claims, 4 Drawing Sheets

(58) Field of Classification Search
USPC .......... 318/400.01, 400.02, 400.14, 400.15,318/400.11, 400.12, 400.13, 700, 701, 721,318/400.21, 400.22, 400.26, 400.27, 400.28,318/727, 801, 432; 388/800, 819
See application file for complete search history.

(56) References Cited

U.S. PATENT DOCUMENTS

| | | | |
|---|---|---|---|
| 8,653,782 | B2 | 2/2014 | Iwamiya |
| 8,766,576 | B2 * | 7/2014 | Christmann ........ H02P 29/0241 318/400.21 |
| 2010/0244714 | A1 | 9/2010 | Abouda et al. |

FOREIGN PATENT DOCUMENTS

| | | |
|---|---|---|
| DE | 102012205471 A1 | 10/2012 |
| EP | 0945970 A2 | 9/1999 |
| JP | 2010088183 A | 4/2010 |
| WO | 2009063274 A1 | 5/2009 |
| WO | 2011023137 A1 | 3/2011 |

\* cited by examiner

DETECTION OF A WIRE-BREAK FAULT DURING THE OPERATION OF A BRUSHLESS D.C. MOTOR

BACKGROUND OF THE INVENTION

Field of the Invention

The invention relates to method for the detection of a wire-break fault during the operation of a brushless d.c. motor which is provided with a three-phase stator winding and is controlled by means of pulse width modulation. The invention also relates to a device for the execution of the method.

In applications involving high-power brushless d.c. motors, it is extremely important that the motor control system should be able to detect wire-break faults in motors, for example open connections between the phase windings or in the motor feeder cable.

Methods are known from the prior art, for example, whereby wire-break faults can be detected in disconnected motors. To this end, one phase connection of the motor is connected to a current source and the remaining phase connections are connected to pull-down resistors, and the voltages on all the phase connections are measured. Where the motor is in a fault-free condition, the voltages on all the phase connections will be equal, whereas a wire-break fault results in a voltage difference, and can be detected accordingly. However, methods of this type cannot be executed when the motor is running.

Alternative methods exploit the property whereby a wire-break fault reduces the total current consumption of a motor and can be detected accordingly, in that a measured current consumption of the motor is significantly lower than an anticipated current consumption. However, methods of this type are unsuitable for motors which are required to operate over a wide load capacity range, as low-load operation may be mistaken for a wire-break fault.

These methods also require a relatively long verification time for the detection of a wire-break fault, and are therefore unsuitable for safety-related applications, in which a rapid response to wire-break faults is required.

The property can also be exploited whereby, in case of the control of the motor phases by means of half-bridges comprised of two MOSFETs respectively (MOSFET=metal oxide semiconductor field-effect transistor), as a result of a free-wheeling current which flows in a body diode of one of the MOSFETs at times when both MOSFETs in a half-bridge are disconnected simultaneously, a motor phase voltage either falls below a grounding level by the margin of a diode forward voltage, or exceeds a supply voltage by the margin of a diode forward voltage. A wire-break fault prevents the flow of a free-wheeling current and, in principle, can therefore be detected on the grounds that the motor phase voltage never falls below the grounding level nor ever exceeds the supply voltage. However, on the grounds of the small measuring signals involved, this method requires a high degree of measuring accuracy and, in the light of the temperature-dependence of the diode forward voltage, is also highly temperature-dependent.

BRIEF SUMMARY OF THE INVENTION

The object of the invention is the proposal of an improved method for the detection of a wire-break fault during the operation of a brushless d.c. motor. The object of the invention is also the proposal of a device for the execution of the method.

In respect of the method, the object according to the invention is fulfilled by the characteristics described in the main method claim and, in respect of the device, by the characteristics described in the main device claim.

Advantageous configurations of the invention are described in the sub-claims.

In the method according to the invention for the detection of a wire-break fault during the operation of a brushless d.c. motor which is provided with a three-phase stator winding and is controlled by means of PWM (pulse width modulation), a switch-on delay interval for a transition of an electrical phase potential applied to the stator winding phase from a switch-off potential to a switch-on potential and a switch-off delay interval for the transition of said phase potential from the switch-on potential to the switch-off potential are recorded for at least one stator winding phase of the stator winding during each PWM cycle period. Moreover, a lower deviation limit is defined for a deviation of the recorded switch-off delay intervals from the recorded switch-on delay intervals, and a wire-break fault is deduced if the deviations of the recorded switch-off delay intervals from the recorded switch-on delay intervals fall below the lower deviation limit.

The invention exploits the property whereby, during the wire-break fault-free operation of the brushless d.c. motor, a switch-on delay interval and a switch-off delay interval, within which, during a PWM cycle period, an electrical phase potential applied to one stator winding phase responds to the adjustment of a PWM signal with a time delay, are significantly different from each other whereas, in the event of a wire-break affecting said stator winding phase, the switch-on delay interval and the switch-off delay interval entirely, or almost entirely coincide, as described in greater detail below. Accordingly, the recording and evaluation of the switch-on delay intervals and the switch-off delay intervals permit the detection of a wire-break, in that the switch-on delay intervals and the switch-off delay intervals are not significantly different from each other.

The method has an advantage, in that it permits the rapid and reliable detection of a wire-break during the running of the motor. The method is also applicable to motors with a wide load capacity range, and is relatively independent of signal noise. Moreover, the method permits the substantially temperature-independent detection of a wire-break, as it is barely influenced by the temperature-dependence of diode forward voltages. The method can also be cost-effectively implemented by the use of digital logic circuits, as described below.

In one embodiment of the invention it is provided that, for each PWM cycle period, a delay margin is determined as the magnitude of the difference between the switch-on delay interval recorded in said PWM cycle period and the switch-off delay interval recorded in said PWM cycle period.

A delay margin of this type constitutes a straightforward and efficient measure of the deviations of the switch-on delay intervals from the switch-off delay intervals and, accordingly, is advantageously appropriate for the evaluation of said deviations. The value generation associated with the delay margin takes account of the fact that, depending upon the circuit state of the motor control circuit in wire-break fault-free motor operation, the switch-on delay interval will either be smaller than the switch-off delay interval, or the switch-off delay interval will be smaller than the switch-on delay interval, as described in greater detail below.

In a further development of this embodiment, a differential threshold value is stipulated for the delay margins and, on a continuous basis, an instantaneous under-range number of previous sequential PWM cycle periods, during which the delay margins were respectively smaller than the differential threshold value or equal to the differential threshold value, is recorded.

The under-range number thus determined is an appropriate quantitative measure for an evaluation of deviations between the switch-off delay intervals and the switch-on delay intervals.

To this end, the instantaneous under-range number is preferably incremented by one, where the delay margin in an instantaneous PWM cycle period is smaller than the differential threshold value or equal to the differential threshold value, and is set to zero, where the delay margin in an instantaneous PWM cycle period is greater than the differential threshold value.

Advantageously, this permits a particularly straightforward implementation of the determination of the under-range number, for example by means of a digit counter.

In a further development of the above-mentioned embodiments of the invention, a number threshold value is stipulated for the under-range number, and the lower limit of deviation is defined such that the instantaneous under-range number is equal to the number threshold value, such that a wire-break fault will be deduced where the instantaneous under-range number exceeds the number threshold value.

This criterion is particularly advantageous for the detection of a wire-break, in that it "filters out" minor deviations between the switch-off delay intervals and the switch-on delay intervals which are attributable, not to a wire-break, but to current or voltage variations or electromotive reactions, whereby a wire-break fault will only be deduced in the event of the prolonged and systematic occurrence of smaller deviations. The error rate in the detection of wire-break faults can be advantageously reduced accordingly.

Further embodiments of the invention provide that, as a switch-on delay interval for a stator winding phase, a time interval between a switch-on changeover of the associated PWM signal for the initiation of the setting of the switch-on potential of the phase potential and the actual achievement of said switch-on potential is recorded and/or, as a corresponding switch-off delay interval, a time interval between a switch-off changeover of the PWM signal for the initiation of the setting of the switch-off potential of the phase potential and the actual achievement of said switch-off potential is recorded.

These embodiments advantageously exploit the availability of the PWM signal for the definition and determination of the switch-on delay intervals and/or switch-off delay intervals.

A device according to the invention incorporates a time recording unit for the recording of the switch-on delay interval and the switch-off delay interval for a stator winding phase during a PWM cycle period, a comparator unit for the determination of a deviation between the switch-off delay interval recorded in a given PWM cycle period and the switch-on delay interval recorded in a given PWM cycle period, and an evaluation unit for the evaluation of deviations identified by the comparator unit.

A device of this type permits the execution of the method according to the invention having the above-mentioned advantages.

In this arrangement, the time recording unit is preferably provided with inputs for the reception of a PWM signal and a phase potential, and executes time-cycle counting loops by means of which, following a switch-on changeover of the PWM signal for the initiation of the setting of a switch-on potential for the phase potential, a switch-on number of sequential time increments through to the actual achievement of said switch-on potential is determined and, following a switch-off changeover of the PWM signal for the initiation of the setting of a switch-off potential for the phase potential, a switch-off number of sequential time increments through to the actual achievement of said switch-off potential is determined.

Accordingly, the switch-on delay intervals and switch-off delay intervals can be advantageously determined by means of simple digital logic circuits for the execution of counting loops.

In addition, the comparator unit preferably determines a delay margin as the magnitude of the difference between the switch-on delay interval recorded in the PWM cycle period and the switch-off delay interval recorded in the PWM cycle period.

Advantageously, this permits the above-mentioned quantitative evaluation of the recorded switch-on delay intervals and switch-off delay intervals.

To this end, the evaluation unit preferably compares the delay margin determined by the comparator unit with a stipulated differential threshold value, and increments an under-range number by one, where the delay margin in an instantaneous PWM cycle period is smaller than the differential threshold value or equal to the differential threshold value, and sets the under-range number to zero, where the delay margin in an instantaneous PWM cycle period is greater than the differential threshold value.

Advantageously, this permits the achievement of the above-mentioned criterion for the detection of a wire-break, wherein minor deviations between the switch-off delay intervals and the switch-on delay intervals, which are not attributable to a wire-break, are "filtered out".

BRIEF DESCRIPTION OF THE SEVERAL VIEWS OF THE DRAWING

Examples of the embodiment of the invention are described in greater detail hereinafter, with reference to the drawings.

In said drawings.

DESCRIPTION OF THE INVENTION

In all the diagrams, corresponding elements are represented by the same reference numbers.

Figure 1:
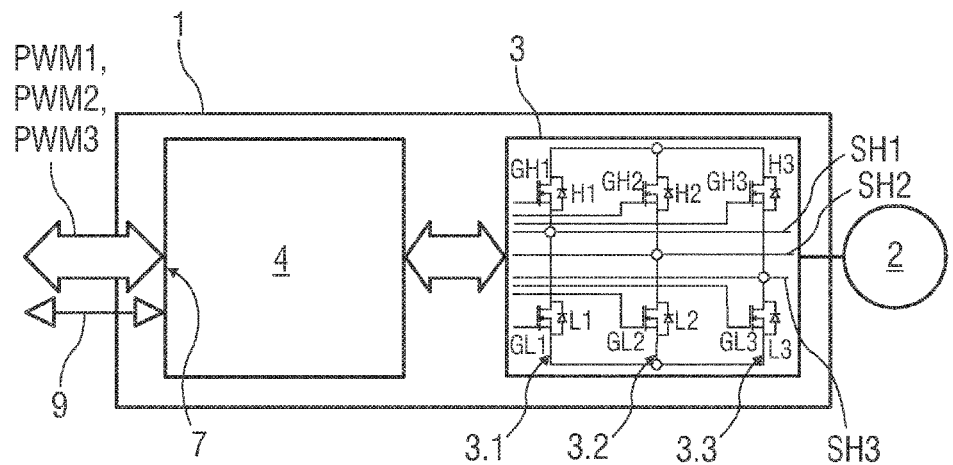
FIG. 1 shows a schematic representation of a motor control device for a brushless d.c. motor.

FIG. 1 shows a schematic representation of a motor control device 1 for the commutation of a brushless d.c. motor 2, which is not represented in greater detail, with a rotor and a three-phase stator winding.

The motor control device 1 comprises a converter 3, which is provided with an electric half-bridge 3.1., 3.2., 3.3 for each of the three stator winding phases of the stator winding of the motor 2. Each half-bridge 3.1, 3.2, 3.3 is provided with a first electronic switch H1, H2, H3 and a second electronic switch L1, L2, L3, between which the respective stator winding phase of the motor 2 is connected via a half-bridge output SH1, SH2, SH3. The first electronic switches H1, H2, H3 are arranged in parallel, and connected to a positive pole of a voltage supply of the converter 3. The second electronic switches L1, L2, L3 are also arranged in parallel, and connected to a negative pole of the voltage supply. In the embodiment of the converter 3 represented, the electronic switches H1, H2, H3, L1, L2, L3 are each configured as a MOSFET (metal oxide semiconductor field-effect transistor) with a gate GH1, GH2, GH3, GL1, GL2, GL3 and a body diode.

The motor control device 1 also comprises a control unit 4 for the control of the electronic switches H1, H2, H3, L1, L2, L3 by means of PWM (pulse width modulation). The control unit 4 is provided with at least one interface 7 for the reception of motor control signals, specifically the PWM signals PWM1, PWM2, PWM3 for the individual stator winding phases, and SPI communication signals 9 (SPI=serial peripheral interface) from a system microcontroller, which is not represented.

Figure 2:
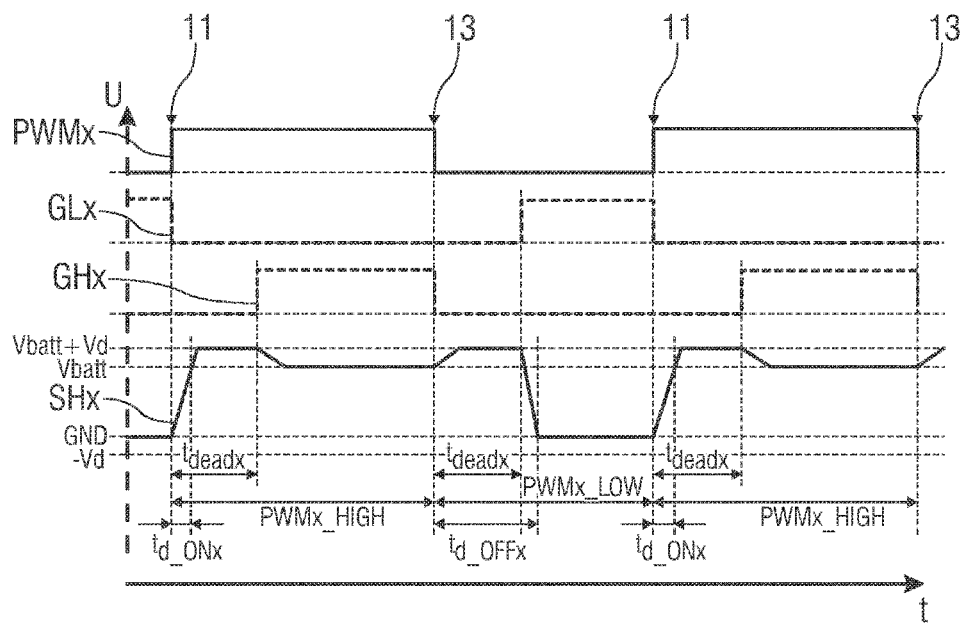
FIG. 2 shows a schematic representation of the time characteristics of electrical voltages in an electric half-bridge for the control of a phase potential of a brushless d.c. motor in a first circuit state of the half-bridge.

For one of the half-bridges 3.1, 3.2., 3.3, FIG. 2 shows a schematic representation of the characteristics of electrical voltages U against time t during the wire-break fault-free operation of the motor 2. Characteristics are represented for a circuit state in which, during the dead time intervals $t_{deadx}$ of the half-bridge 3.1, 3.2, 3.3, during which both electronic switches H1, H2, H3, L1, L2, L3 of the half-bridge 3.1, 3.2, 3.3 are disconnected, a free-wheeling current flows in the body diode of the first electronic switch H1, H2, H3 of the half-bridge 3.1, 3.2, 3.3.

PWMx designates the PWM signal PWM1, PWM2, PWM3 for the control of the respective stator winding phase (wherein x represents the digits 1, 2, 3). PWMx oscillates between an upper PWM level and a lower PWM level, and assumes the upper PWM level during first PWM time intervals PWMx_HIGH, and assumes the lower PWM level during second PWM time intervals PWMx_LOW. A switch-on changeover 11 from the lower to the upper PWM level initiates the setting of a switch-on potential Vbatt for an electrical phase potential SHx applied to the respective half-bridge output SH1, SH2, SH3 and, accordingly, to the respective stator winding phase (and to the associated motor connection). A switch-off changeover 13 from the upper to the lower PWM level initiates the setting of a switch-off potential GND for the phase potential SHx. In this case, Vbatt is a supply voltage potential and GND is a grounding potential, which defines the zero potential level.

Upon switch-on and switch-off, the phase potential SHx during the dead time intervals $t_{deadx}$ briefly exceeds the switch-on potential Vbatt by a diode forward voltage Vd of the body diode of the first electronic switch H1, H2, H3, as a result of the free-wheeling current flowing in the body diode.

GLx designates a control potential applied to the gate GL1, GL2, GL3 of the second electronic switch L1, L2, L3 of the respective half-bridge 3.1, 3.2, 3.3. GHx designates a control potential applied to the gate GH1, GH2, GH3 of the first electronic switch H1, H2, H3, L1, L2, L3 of the half-bridge 3.1, 3.2, 3.3. Depending upon PWMx, GLx and GHx oscillate between an upper potential level and a lower potential level. The dead time intervals $t_{deadx}$ are those time intervals in which GLx and GHx simultaneously assume the lower potential level.

The phase potential SHx reacts to changes in PWMx with a time delay. Between a switch-on changeover 11 and the achievement of the switch-on potential Vbatt initiated thereby, a switch-on delay interval $t_{d\_ONx}$ elapses. Between a switch-off changeover 13 and the achievement of the switch-off potential GND initiated thereby, a switch-off delay interval $t_{d\_OFFx}$ elapses. As a result of the free-wheeling current flowing in the body diode of the first electronic switch H1, H2, H3, the switch-on delay interval $t_{d\_ONx}$ is significantly smaller than the switch-off delay interval $t_{d\_OFFx}$.

Figure 3:
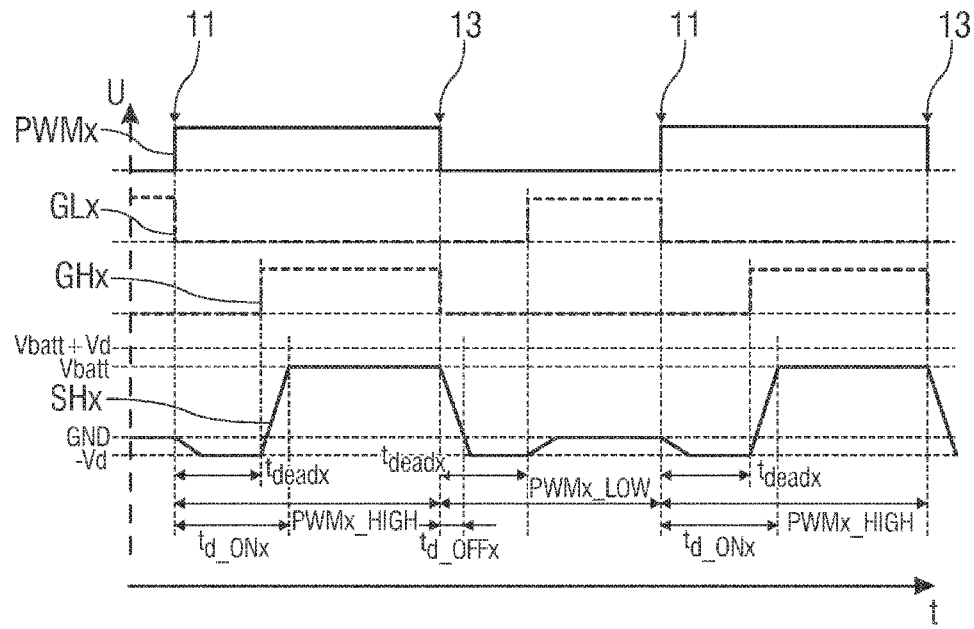
FIG. 3 shows a schematic representation of the time characteristics of electrical voltages in an electric half-bridge for the control of a phase potential of a brushless d.c. motor in a second circuit state of the half bridge.

Analogously to FIG. 2, FIG. 3 shows a schematic representation of the time characteristics of PWMx, GLx, GHx and SHx during the wire-break fault-free operation of the motor 2 for a circuit state in which, during the dead time intervals $t_{deadx}$, the free-wheeling current flows in the body diode of the second electronic switch L1, L2, L3 of the half-bridge 3.1, 3.2, 3.3.

As a result of the free-wheeling current flowing in the body diode of the second electronic switch L1, L2, L3, during the dead time intervals $t_{deadx}$, SHx briefly falls below the switch-off potential GND by the diode forward voltage Vd, and the switch-off delay interval $t_{d\_OFFx}$ is significantly smaller than the switch-on delay interval $t_{d\_ONx}$.

Figure 4:
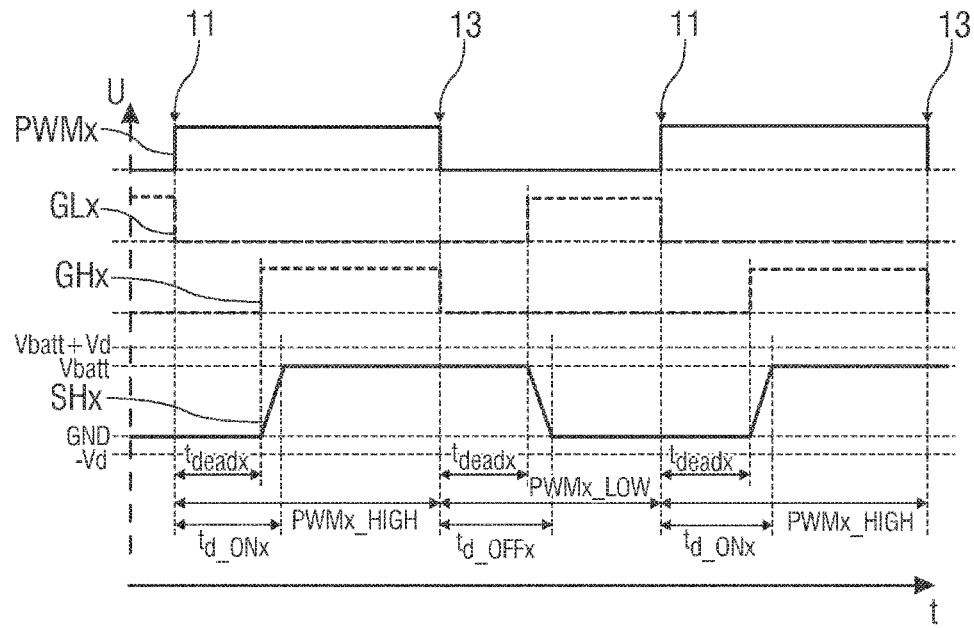
FIG. 4 shows a schematic representation of the time characteristics of electrical voltages in an electric half-bridge for the control of a phase potential of a brushless d.c. motor in the event of a wire-break fault.

Analogously to FIGS. 2 and 3, FIG. 4 shows a schematic representation of the time characteristics of PWMx, GLx, GHx and SHx for one of the half-bridges 3.1, 3.2, 3.3 during the operation of the motor 2, in the event of a wire-break fault in the corresponding motor feeder cable. In this case, no free-wheeling current flows and, as a result, the switch-off delay interval $t_{d\_OFFx}$ and the switch-on delay interval $t_{d\_ONx}$ coincide entirely, or almost entirely.

Figure 5:
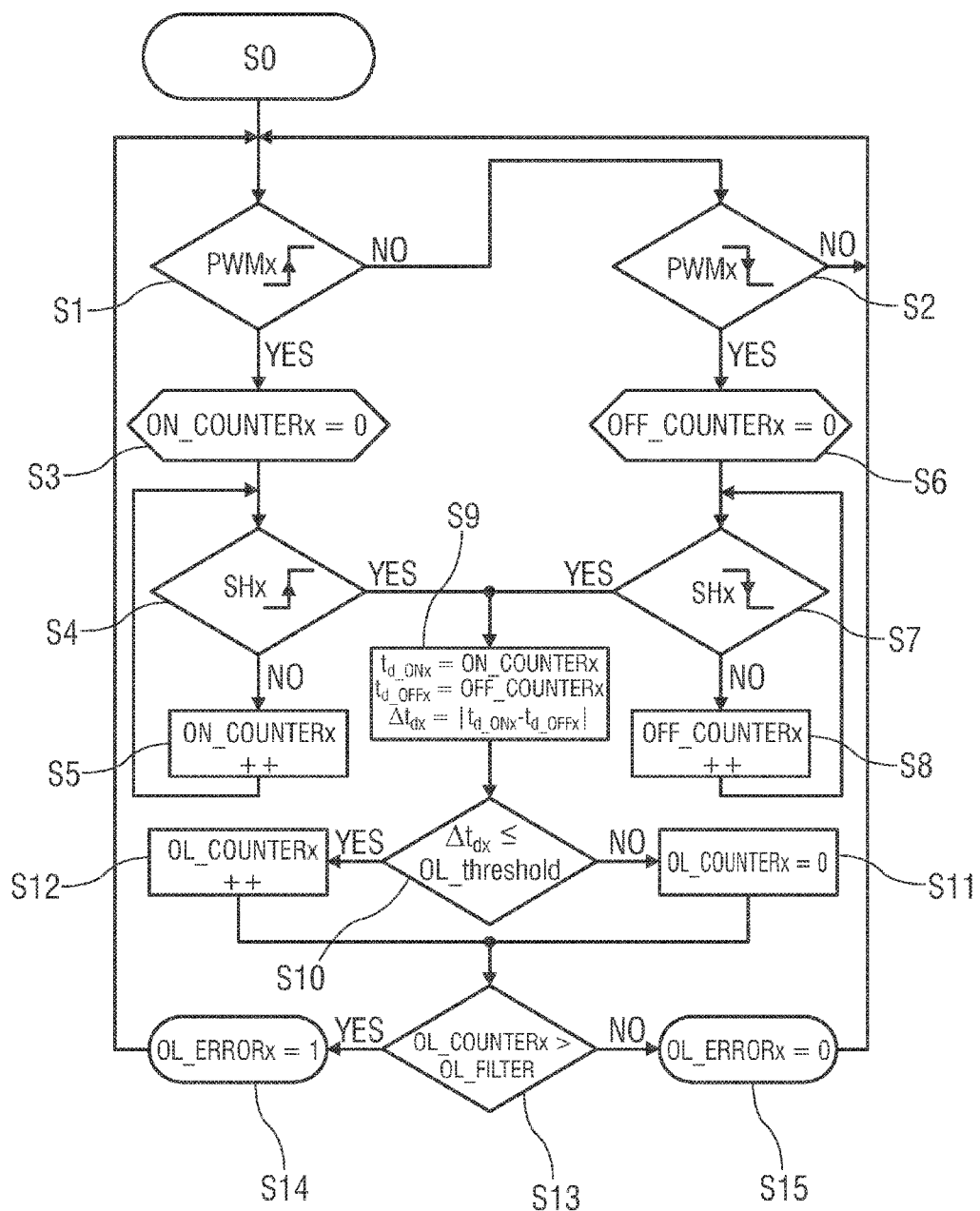
FIG. 5 shows a flowchart for a method for the detection of a wire-break fault during the operation of a brushless d.c. motor.

FIG. 5 shows a flowchart of a method for the detection of a wire-break fault during the operation of a brushless d.c. motor 2. The method exploits the property whereby, in the event of a wire-break fault affecting a stator winding phase, the switch-off delay interval $t_{d\_OFFx}$ coincides entirely, or almost entirely, with the switch-on delay interval $t_{d\_ONx}$ whereas, in the absence of a wire-break fault, it deviates significantly from the switch-on delay interval $t_{d\_ONx}$, as described with reference to FIGS. 2-4.

According to the method, time-cycle process steps S1 to S15 are executed, whereby the pulse frequency is significantly higher than the PWM frequency of PWM, such that a time step between the sequential process steps S1 to S15 is very significantly smaller than the PWM cycle period.

After a call-up of the process S0, a first process step S1 involves the execution of a check to the effect that a switch-on changeover 11 of PWMx has been completed. If this is not the case, a second process step S2 involves the execution of a check to the effect that a switch-off changeover 13 has been completed. If this is also not the case, the first process step S1 is repeated.

Where a switch-on changeover 11 is detected in the first process step S1, a switch-on number ON_COUNTERx is initialized with the value zero in a third process step S3. In a fourth process step S4, a check is then executed to the effect that the phase potential SHx has achieved the switch-on potential Vbatt. If this is not the case, in a fifth process step S5, the switch-on number ON_COUNTERx is incremented by one, and the fourth process step S4 is then repeated.

Process steps S4 and S5 are thus repeated for as many times as necessary until, in the fourth process step S4, it is detected that the phase potential SHx has achieved the switch-on potential Vbatt. When this occurs, the actual switch-on number ON_COUNTERx constitutes a direct measure of the switch-on delay interval $t_{d\_ONx}$ in the relevant PWM cycle period, measured in units of a time step between two sequential process steps S1 to S15.

An analogous method is applied where it is detected, in the second process step S2, that a switch-off changeover 13 has been completed. In this case, in a sixth process step S6, a switch-off number OFF_COUNTERx is initialized with the value zero. In a seventh process step S7, a check is then executed to the effect that the phase potential SHx has achieved the switch-off potential GND. If this is not the case, in an eighth process step S8, the switch-off number OFF_COUNTERx is incremented by one, and the seventh process step S7 is then repeated. The process steps S7 and S8 are then repeated as many times as necessary, until it is detected, in the seventh process step S7, that the phase potential SHx has achieved the switch-off potential GND. When this occurs, the actual switch-off number OFF_COUNTERx constitutes a direct measure of the switch-off delay interval $t_{d\_OFFx}$ in the relevant PWM cycle period, measured in units of a time step between two sequential process steps S1 to S15.

In a ninth process step S9, the switch-on number ON_COUNTERx, further to the detection of the switch-on potential Vbatt in S4 is saved as the switch-on delay interval $t_{d\_ONx}$ and the switch-off number OFF_COUNTERx, further to the detection of the switch-off potential GND in S7, is saved as the switch-off delay interval $t_{d\_oFFx}$. In addition, a delay margin $\Delta t_{dx}$ is constituted as the magnitude $|t_{d\_ONx}-t_{d\_OFFx}|$ of the differential $t_{d\_ONx}-t_{d\_OFFx}$.

In a tenth process step S10, a check is executed to the effect that the delay margin $\Delta t_{dx}$ is greater than a stipulated differential threshold value OLt_threshold. If this is the case, an under-range number OL_COUNTERx is set to the value zero in an eleventh process step S11. Otherwise, the under-range number OL_COUNTERx, in a twelfth process step S12, is incremented by one (the under-range number OL_COUNTERx is initialized at the value zero upon the call-up of the process S0).

In a thirteenth process step S13, a check is then executed to the effect that the under-range number OL_COUNTERx is greater than a stipulated number threshold value OL_FILTER. If this is the case, in a fourteenth process step S14, a wire-break fault signal Ox_ERRORx is set to the value of one, in order to indicate a wire-break fault on the relevant stator winding phase. Otherwise, in a fifteenth process step S15, the wire-break fault signal OL_ERRORx is set to the value zero.

The process described with reference to FIG. 5 is executed separately for each stator winding phase of the motor 2, or for each half-bridge 3.1, 3.2, 3.3 of the converter 3.

Figure 6:
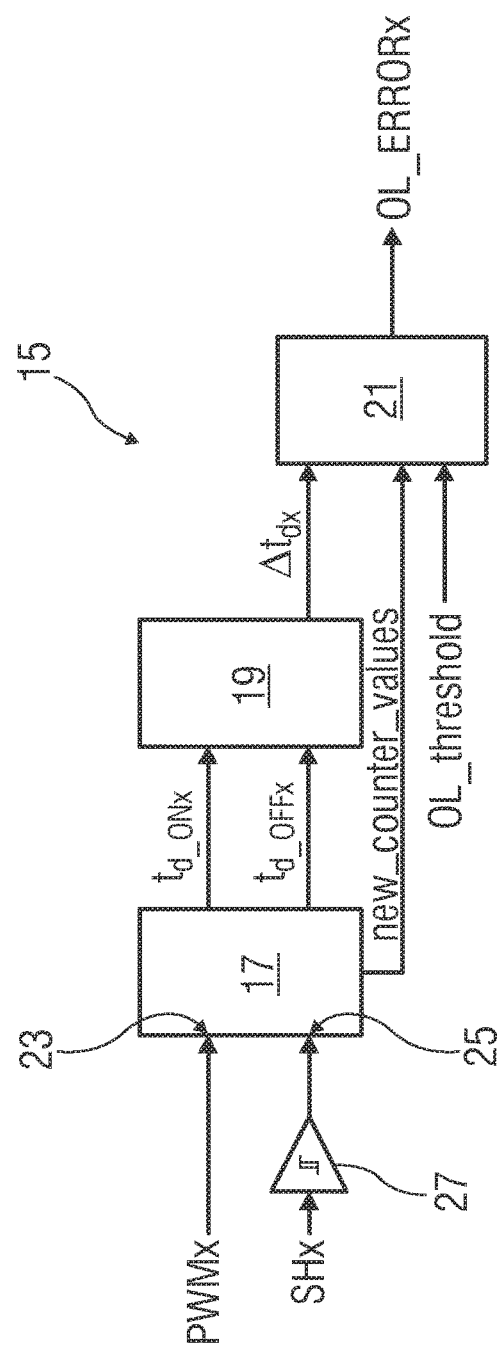
FIG. 6 shows a block diagram of a device for the detection of a wire-break fault during the operation of a brushless d.c. motor.

FIG. 6 shows a block diagram of a device 15 for the execution of the method represented in FIG. 5 for the detection of a wire-break fault during the operation of a brushless d.c. motor 2.

The device 15 comprises a time recording unit 17 for the detection of the switch-on delay interval $t_{d\_ONx}$ and the switch-off delay interval $t_{d\_OFFx}$ for a stator winding phase during a PWM cycle period, a comparator unit 19 for the determination of a deviation between the switch-off delay interval $t_{d\_oFFx}$ recorded during a PWM cycle period and the switch-on delay interval $t_{d\_ONx}$ recorded during the PWM cycle period, and an evaluation unit 21 for the evaluation of the deviations determined by the comparator unit 19.

The time recording unit 17 is provided with a first input 23 for the reception of PMWx, and a second input 25 for the reception of a phase potential SHx which has been appropriately adapted by a level converter 27. The time recording unit 17 is configured for the execution of the process steps S1 to S8 described above and, correspondingly, in accordance with PWMx and SHx, during each PWM cycle period, records the switch-on delay interval $t_{d\_ONx}$ and the switch-off delay interval $t_{d\_OFFx}$, and transmits the recorded switch-on delay interval $t_{d\_ONx}$ and the recorded switch-off delay interval $t_{d\_OFFx}$ to the comparator unit 19. In addition, the time recording unit 17 transmits a notification signal new_counter_values to the evaluation unit 21, which indicates the detection of new measuring signals by the time recording unit 17.

The comparator unit 19 executes the process step S9 described above, i.e. it determines the delay margin $\Delta t_{dx}$ as the magnitude $|t_{d\_ONx}-t_{d\_OFFx}|$ of the differential $t_{d\_ONx}-t_{d\_OFFx}$, and transmits the delay margin $\Delta t_{dx}$ thus determined to the evaluation unit 21.

The evaluation unit 21 executes the process steps S10 to S15 described above, i.e. it compares the delay margin $\Delta t_{dx}$ determined by the comparator unit 19 with a stipulated differential threshold value OL_threshold which is fed thereto, and increments the value of an under-range number OL_COUNTERx by one, where the delay margin $\Delta t_{dx}$ is smaller than or equal to the differential threshold value OL_threshold, or sets the value of the under-range number OL_COUNTERx to zero, where the delay margin $\Delta t_{dx}$ in an instantaneous PWM cycle period is greater than the differential threshold value OL_threshold. It also determines whether the under-range number OL_COUNTERx is greater than a stipulated number threshold value OL_FILTER, sets the value of the wire-break fault signal OL_ERRORx correspondingly, and transmits the latter.

A device 15 represented in FIG. 6 is implemented separately for each stator winding phase of the motor 2, or for each half-bridge 3.1, 3.2, 3.3 of the converter 3.

LIST OF REFERENCE NUMBERS

1 Motor control device
2 Brushless d.c. motor
3 Converter
3.1, 3.2, 3.3 Half-bridge
4 Control unit
7 Interface
9 SPI communication signal
11 Switch-on changeover
13 Switch-off changeover
15 Device
17 Time recording unit
19 Comparator unit
21 Evaluation unit 23 First input
25 Second input
27 Level converter
$\Delta t_{dx}$ Delay margin
GH1, GH2, GH3, GL1, GL2, GL3 Gate
GHx, GLx Control potential
GND Switch-off potential
H1, H2, H3 First electronic switch
L1, L2, L3 Second electronic switch
new_counter_values Notification signal
OFF_COUNTERx Switch-off number
OL_COUNTERx Under-range number
OL_ERRORx Wire-break fault signal
OL_FILTER Number threshold value
OL_threshold Differential threshold value
ON_COUNTERx Switch-on number
PWM1, PWM2, PWM3, PWMx PWM signal
PWMx_HIGH First PWM time interval
PWMx_LOW Second PWM time interval
S0 Process call-up
S1 to S15 Process step
SH1, SH2, SH3 Half-bridge output
SHx Phase potential
t Time
$t_{deadx}$ Dead time interval
$t_{d\_OFFx}$ Switch-off delay interval
$t_{d\_ONx}$ Switch-on delay interval
U Voltage
Vbatt Switch-on potential
Vd Diode forward voltage

The invention claimed is:

1. A method for detecting a wire-break fault during an operation of a brushless D.C. motor having a three-phase stator winding and controlled by pulse width modulation, which comprises the steps of:
   recording at least one stator winding phase of a stator winding during each pulse width modulation cycle period, a switch-on delay interval for a transition of an electrical phase potentials applied to the stator winding phase from a switch-off potential to a switch-on potential and a switch-off delay interval for a transition of a phase potential from the switch-on potential to the switch-off potential;
   defining a lower deviation limit for a deviation of recorded switch-off delay intervals from recorded switch-on delay intervals; and
   deducing the wire-break fault if deviations of the recorded switch-off delay intervals from the recorded switch-on delay intervals fall below the lower deviation limit.

2. The method according to claim 1, wherein for each said pulse width modulation cycle period, determining a delay margin as a magnitude of a difference between the switch-on delay interval recorded in the pulse width modulation cycle period and the switch-off delay interval recorded in the pulse width modulation cycle period.

3. The method according to claim 2, which further comprises stipulating a differential threshold value for delay margins and, on a continuous basis, an instantaneous under-range number of previous sequential pulse width modulation cycle periods, during which the delay margins were respectively smaller than the differential threshold value or equal to the differential threshold value is recorded.

4. The method according to claim 3, wherein the instantaneous under-range number is incremented by one, if the delay margin in an instantaneous pulse width modulation cycle period is smaller than the differential threshold value or equal to the differential threshold value, and is set to zero, where the delay margin in the instantaneous pulse width modulation cycle period is greater than the differential threshold value.

5. The method according to claim 3, which further comprises:
   stipulating a number threshold value for the instantaneous under-range number; and
   defining a lower limit of deviation such that the instantaneous under-range number is equal to the number threshold value, such that the wire-break fault will be deduced where the instantaneous under-range number exceeds the number threshold value.

6. The method according to claim 1, wherein during the switch-on delay interval for the stator winding phase, recording a time interval between a switch-on changeover of a pulse width modulation signal for an initiation of a setting of the switch-on potential of the phase potential and an actual achievement of the switch-on potential.

7. The method according to claim 1, wherein during the switch-off delay interval, recording a time interval between a switch-off changeover of a pulse width modulation signal for an initiation of a setting of the switch-off potential of the phase potential and an actual achievement of said switch-off potential.

8. A device for detecting a wire-break fault during an operation of a brushless D.C. motor, the device comprising:
   a time recording unit for recording of a switch-on delay interval and a switch-off delay interval for a stator winding phase during a pulse width modulation cycle period;
   a comparator unit for determining a deviation between the switch-off delay interval recorded in the pulse width modulation cycle period and the switch-on delay interval recorded in the pulse width modulation cycle period; and
   an evaluation unit for evaluating deviations identified by said comparator unit.

9. The device according to claim 8, wherein said time recording unit has inputs for receiving a pulse width modulation signal and a phase potential, and executes time-cycle counting loops by means of which, following a switch-on changeover of the pulse width modulation signal for an initiation of a setting of a switch-on potential for the phase potential, a switch-on number of sequential time increments through to an actual achievement of the switch-on potential is determined and, following a switch-off changeover of the pulse width modulation signal for the initiation of the setting of a switch-off potential for the phase potential, a switch-off number of sequential time increments through to an actual achievement of the switch-off potential is determined.

10. The device according to claim 8, wherein said comparator unit determines a delay margin as a magnitude of a difference between the switch-on delay interval recorded in the pulse width modulation cycle period and the switch-off delay interval recorded in the pulse width modulation cycle period.

11. The device according to claim 10, wherein said evaluation unit compares a delay margin determined by said comparator unit with a stipulated differential threshold value, and increments an under-range number by one, where the delay margin in an instantaneous pulse width modulation cycle period is smaller than the differential threshold value or equal to the differential threshold value, and sets the under-range number to zero, where the delay margin in the instantaneous pulse width modulation cycle period is greater than the differential threshold value.

\* \* \* \* \*